(12) United States Patent
Chen

(10) Patent No.: US 9,409,617 B2
(45) Date of Patent: Aug. 9, 2016

(54) MULTIFUNCTIONAL RIDING VEHICLE

(71) Applicant: Wang-Chuan Chen, Taichung (TW)

(72) Inventor: Wang-Chuan Chen, Taichung (TW)

( * ) Notice: Subject to any disclaimer, the term of this patent is extended or adjusted under 35 U.S.C. 154(b) by 0 days.

(21) Appl. No.: 14/637,444

(22) Filed: Mar. 4, 2015

(65) Prior Publication Data

US 2016/0200389 A1 Jul. 14, 2016

(30) Foreign Application Priority Data

Jan. 12, 2015 (CN) ........................ 2015 2 0018658 U

(51) Int. Cl.
| | |
|---|---|
| *B62K 13/08* | (2006.01) |
| *B62M 1/00* | (2010.01) |
| *B62K 3/00* | (2006.01) |
| *B62K 3/02* | (2006.01) |
| *B62K 15/00* | (2006.01) |

(52) U.S. Cl.
CPC ............. *B62K 13/08* (2013.01); *B62K 3/002* (2013.01); *B62K 3/02* (2013.01); *B62K 15/008* (2013.01); *B62K 2015/001* (2013.01)

(58) Field of Classification Search
CPC .................................. B62K 13/08; B62M 1/00
See application file for complete search history.

(56) References Cited

U.S. PATENT DOCUMENTS

| | | | | | |
|---|---|---|---|---|---|
| 1,282,433 | A | * | 10/1918 | Kinnard ..................... | B62B 7/12 280/7.17 |
| 1,347,384 | A | * | 7/1920 | Kinnard .................... | B62K 9/02 280/7.1 |
| 1,379,305 | A | * | 5/1921 | Johns ....................... | B62K 9/02 280/7.1 |
| 4,079,957 | A | * | 3/1978 | Blease .................... | B62K 13/00 280/278 |
| 4,657,270 | A | * | 4/1987 | Allen ..................... | B62K 13/00 280/282 |
| 8,500,134 | B2 | * | 8/2013 | Tzoreff .................. | B62K 3/002 280/282 |

FOREIGN PATENT DOCUMENTS

TW M467399 U 12/2013

* cited by examiner

*Primary Examiner* — Bryan Evans
(74) *Attorney, Agent, or Firm* — Alan D. Kamrath; Kamrath IP Lawfirm, P.A.

(57) ABSTRACT

A multifunctional riding vehicle includes a steering assembly having a joint. A frame has a main body including an end thereof pivotally connecting to the joint between different fixed positions, and has a platform adapted to be extended and collapsed. The multifunctional riding vehicle has a first configuration in which the main body of the frame is in a first of the fixed positions and the platform is in an extended position, and a second configuration in which the main body of the frame is in a second of the fixed positions and in an upside-down relationship with respect to the first fixed position and the platform is in a collapsed position.

17 Claims, 12 Drawing Sheets

MULTIFUNCTIONAL RIDING VEHICLE

BACKGROUND OF THE INVENTION

1. Field of the Invention

The present invention relates to a riding vehicle and, particularly, to a riding vehicle which is multifunctional and has a simple structural design and that a user can operate easily.

2. Description of the Related Art

TW Patent No. M467399 shows a multifunctional child vehicle. The child vehicle includes a frame and steering and wheel assemblies releasably connected to the frame. The frame is adapted to connect to a steering assembly in two manners. The frame, the steering assembly and the wheel assembly can be connected relative to one another in one manner, such that the child vehicle is adapted to be used as a scooter. When the child vehicle is used as the scooter, the frame includes a first end thereof connecting to the steering assembly and a second end thereof connecting to a wheel assembly, respectively. The frame, the steering assembly and the wheel assembly can also be connected relative to one another in a different manner, such that the child vehicle is adapted to be used as a balance bike. When the child vehicle is used as the balance bike, the first and second ends of the frame are respectively connected to the steering and the wheel assemblies. Nevertheless, it is still desirable to reduce a user's operation effort to transform the child vehicle.

The present invention is, therefore, intended to obviate or at least alleviate the problems encountered in the prior art.

SUMMARY OF THE INVENTION

According to the present invention, a multifunctional riding vehicle includes a steering assembly having a joint. A frame has a main body including an end thereof pivotally connecting to the joint between different fixed positions, and has a platform adapted to be extended and collapsed. The multifunctional riding vehicle has a first configuration in which the main body of the frame is in a first of the fixed positions and the platform is in an extended position, and a second configuration in which the main body of the frame is in a second of the fixed positions and in an upside-down relationship with respect to the first fixed position and the platform is in a collapsed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be under-stood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a multifunctional riding vehicle.

It is another objective of the present invention to provide a multifunctional riding vehicle with a simple structural design and that a user can operate easily.

Other objectives, advantages, and new features of the present invention will become apparent from the following detailed description of the invention when considered in conjunction with the accompanied drawings.

DETAILED DESCRIPTION OF THE INVENTION

Figure 1:
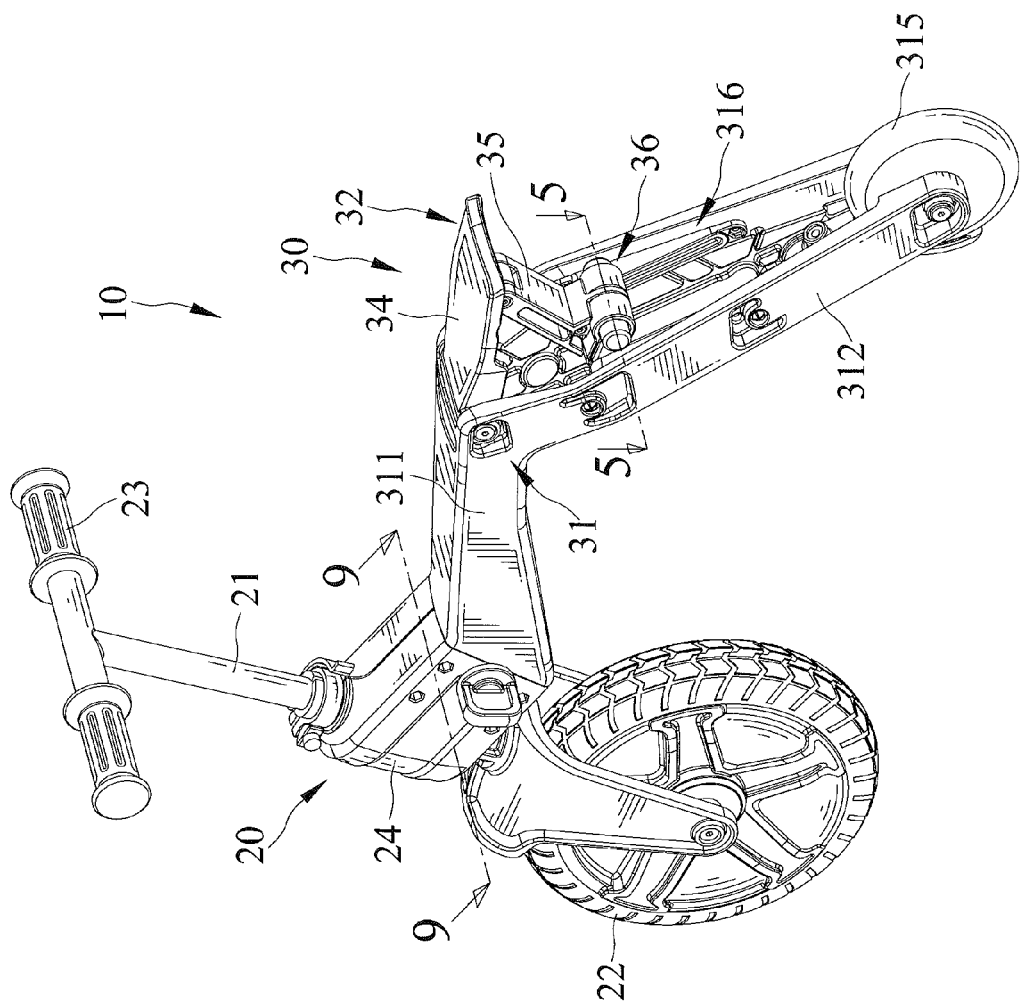
FIG. 1 is a perspective view of a multifunctional riding vehicle in accordance with the present invention.
Figure 2:
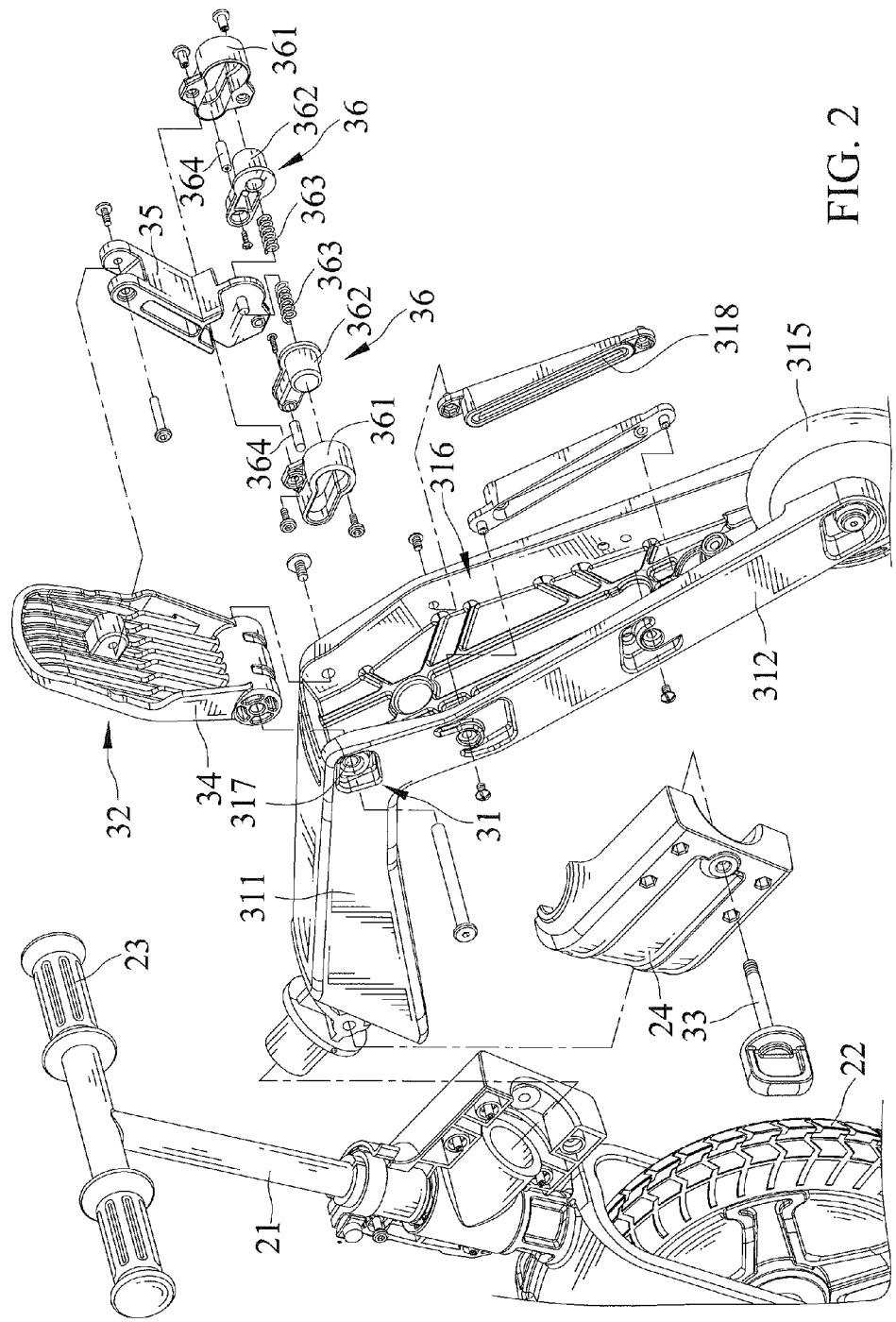
FIG. 2 is an exploded perspective view of the multifunctional riding vehicle of the present invention.
Figure 3:
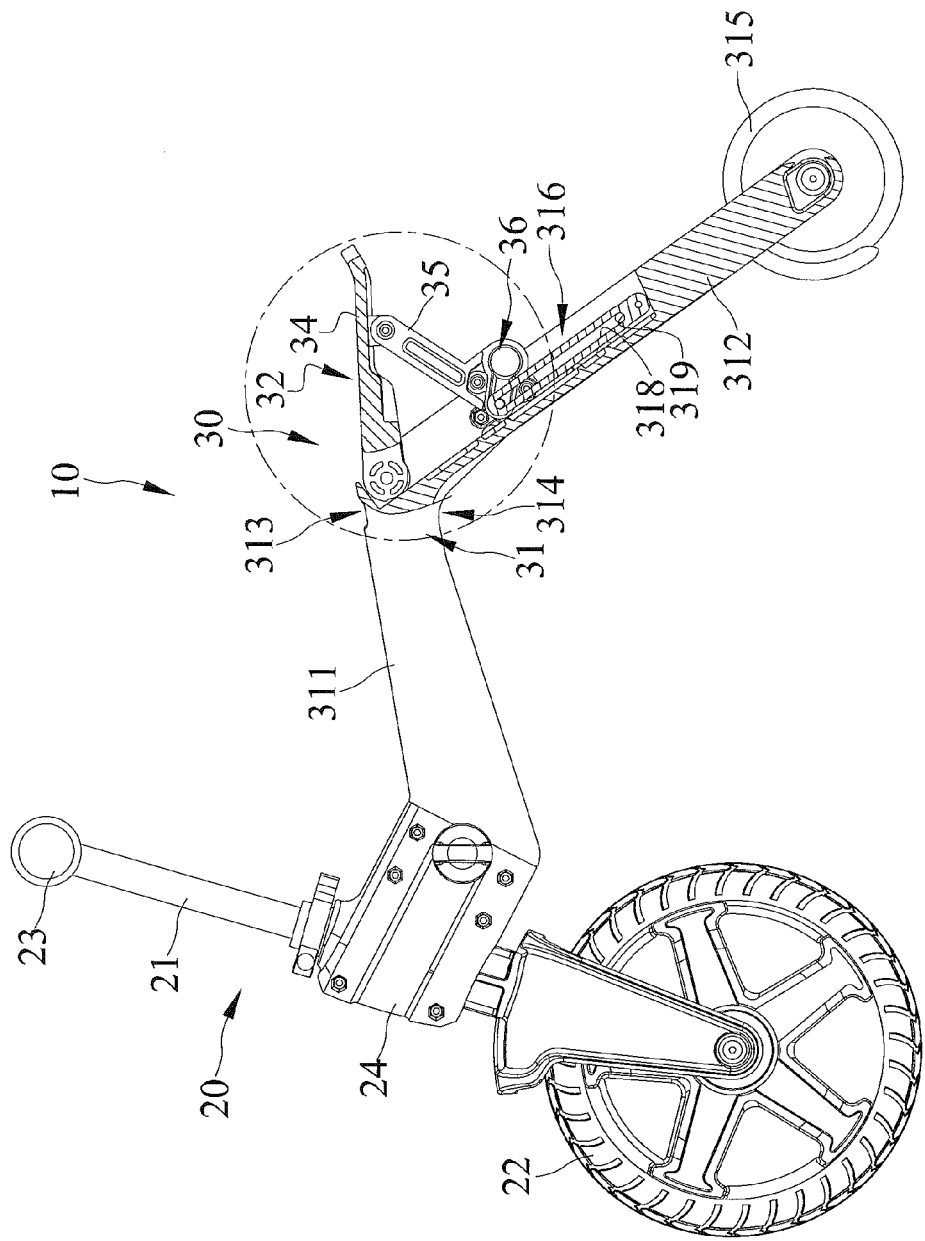
FIG. 3 is a partial, cross-sectional view of the multifunctional riding vehicle of the present invention.
Figure 4:
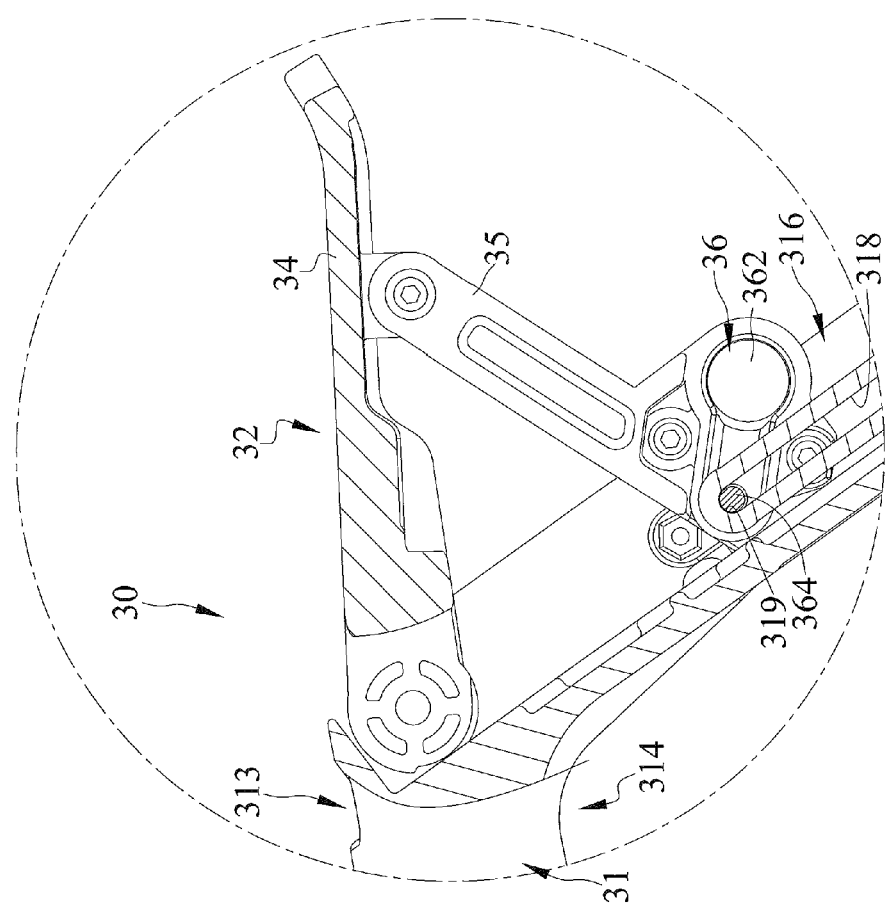
FIG. 4 is an enlarged view of FIG. 3.
Figure 5:
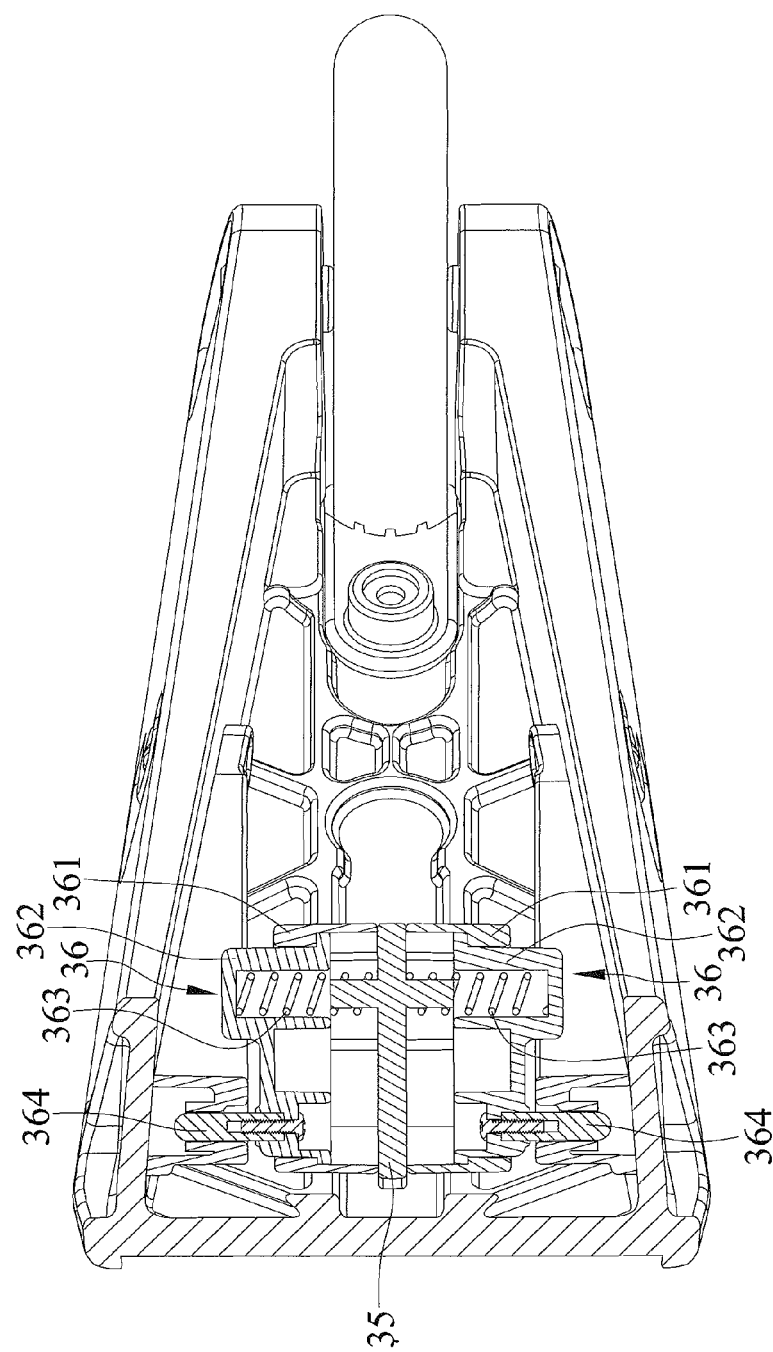
FIG. 5 is a cross-sectional view taken along line 5-5 of FIG. 1.
Figure 6:
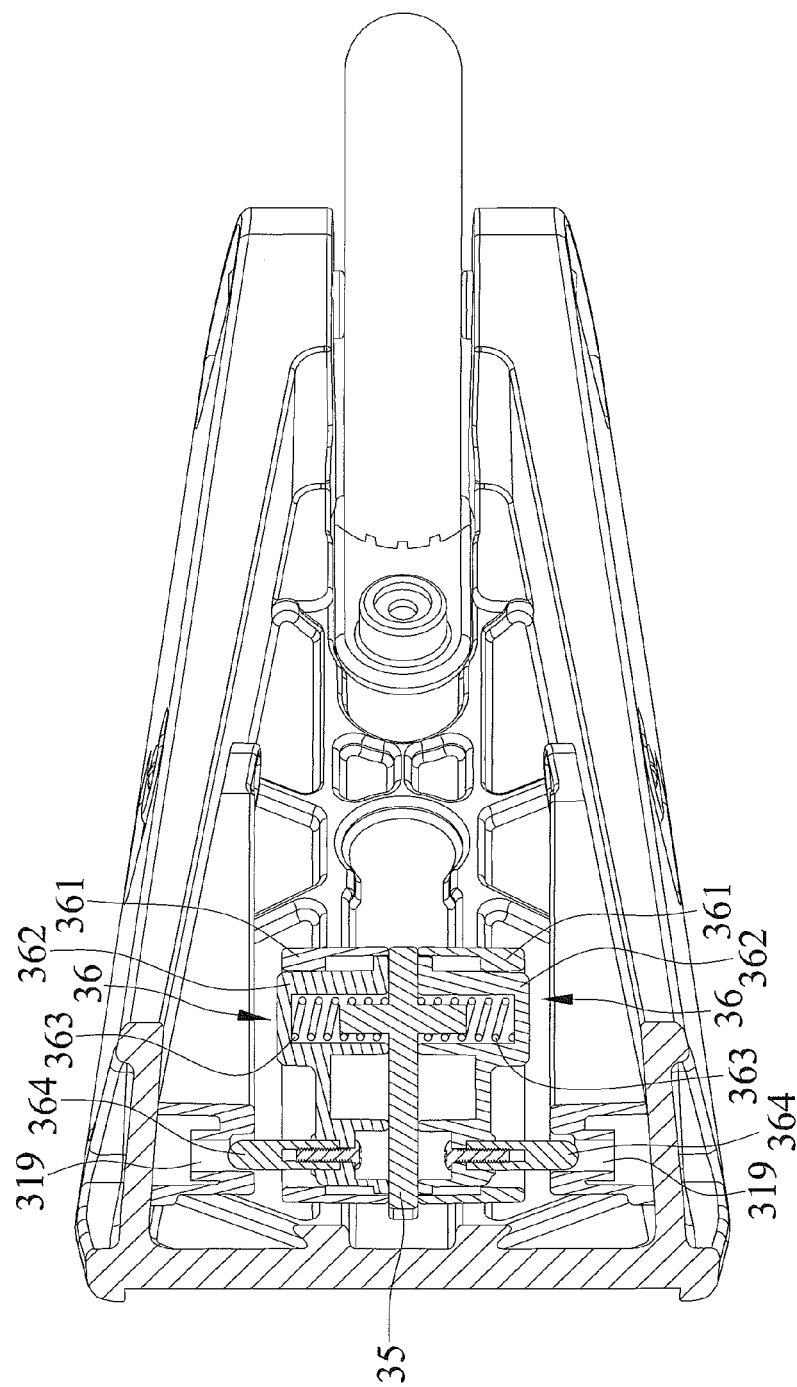
FIG. 6 is a cross-sectional view similar to FIG. 5, but showing a lock of the multifunctional riding vehicle in an unlock position thereof.
Figure 7:
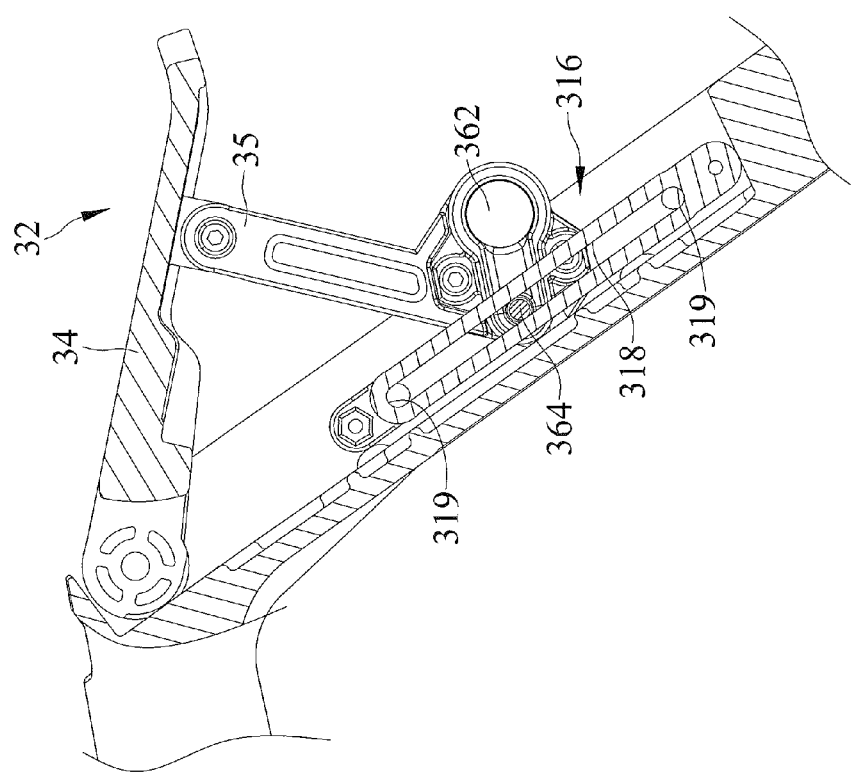
FIG. 7 is a partial, cross-sectional view showing the multifunctional riding vehicle including a structure adapted to be moved to a position different from that shown in FIG. 4 upon unlocking the lock, as shown in FIG. 6.
Figure 8:
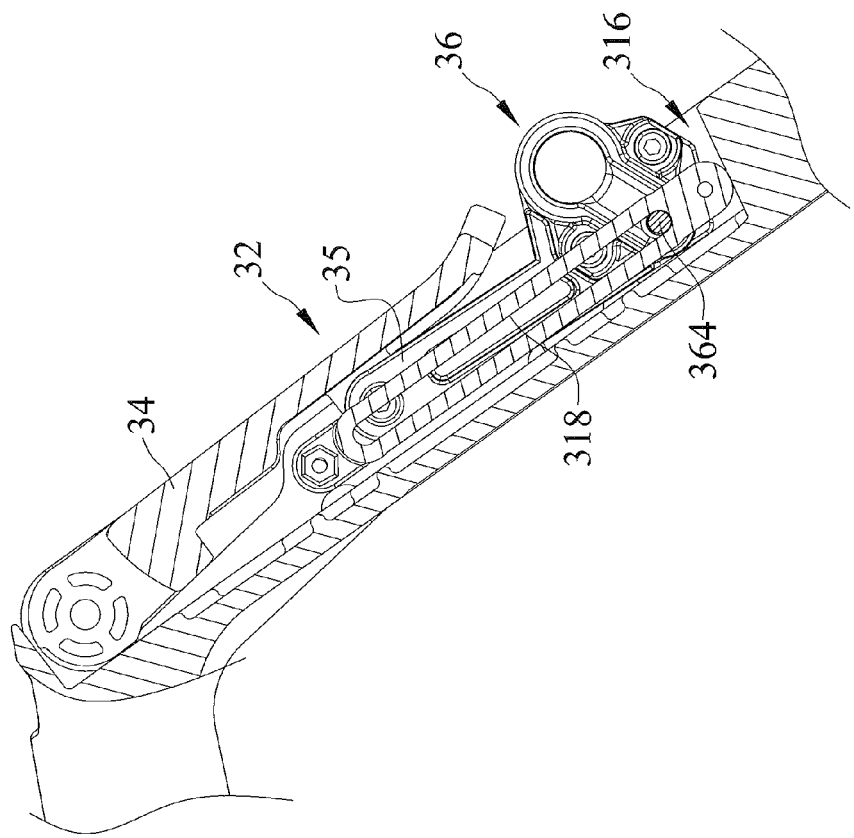
FIG. 8 is a partial, cross-sectional view showing the structure adapted to be moved to a position different from that shown in FIG. 5 upon unlocking the lock, as shown in FIG. 6.
Figure 9:
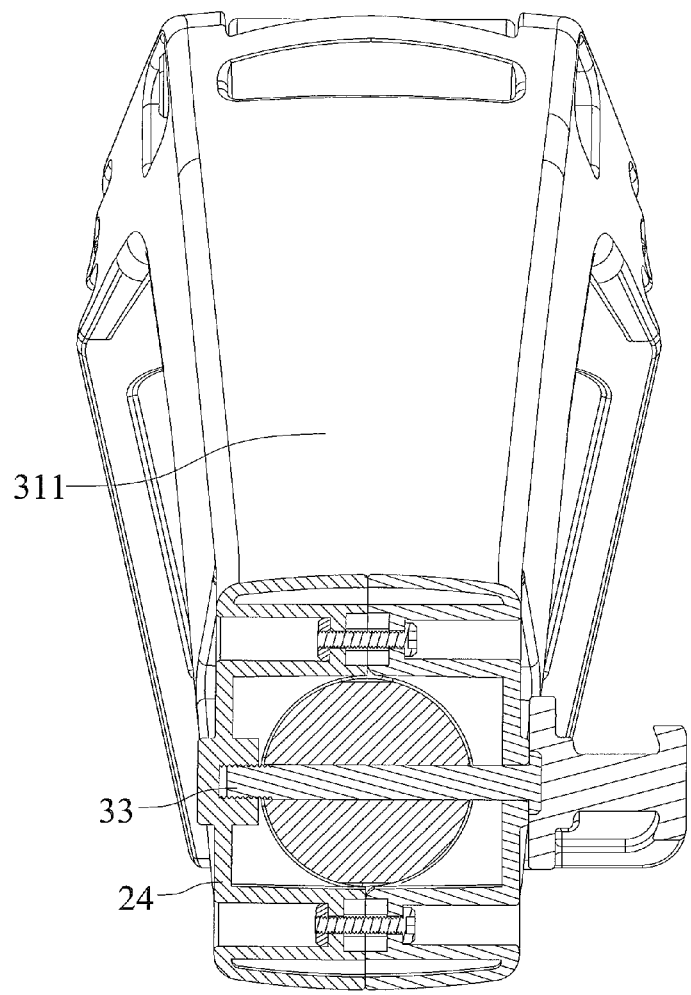
FIG. 9 is a cross-sectional view taken along line 9-9 of FIG. 1.
Figure 10:
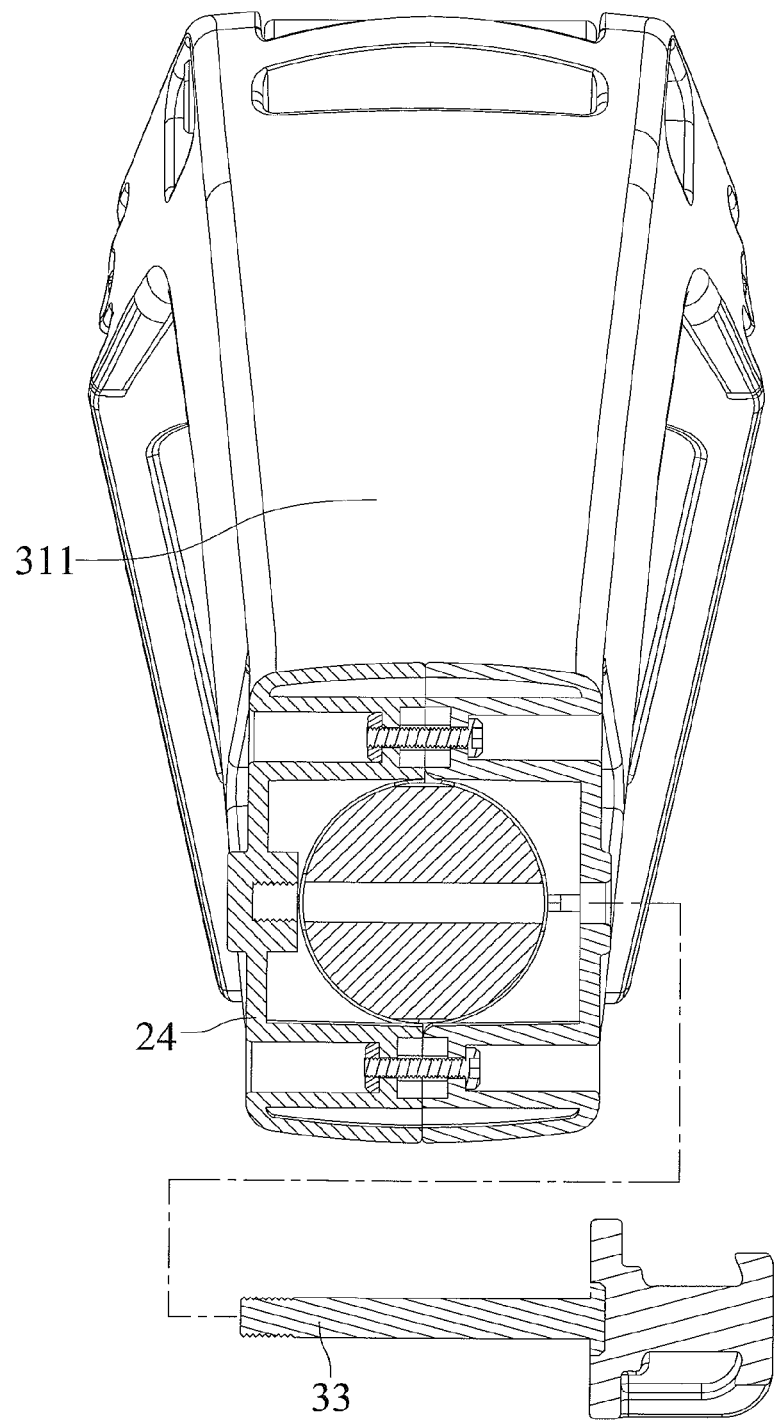
FIG. 10 is an extended cross-sectional view of FIG. 9 showing a fastener being dismounted from the multifunctional riding vehicle.
Figure 11:
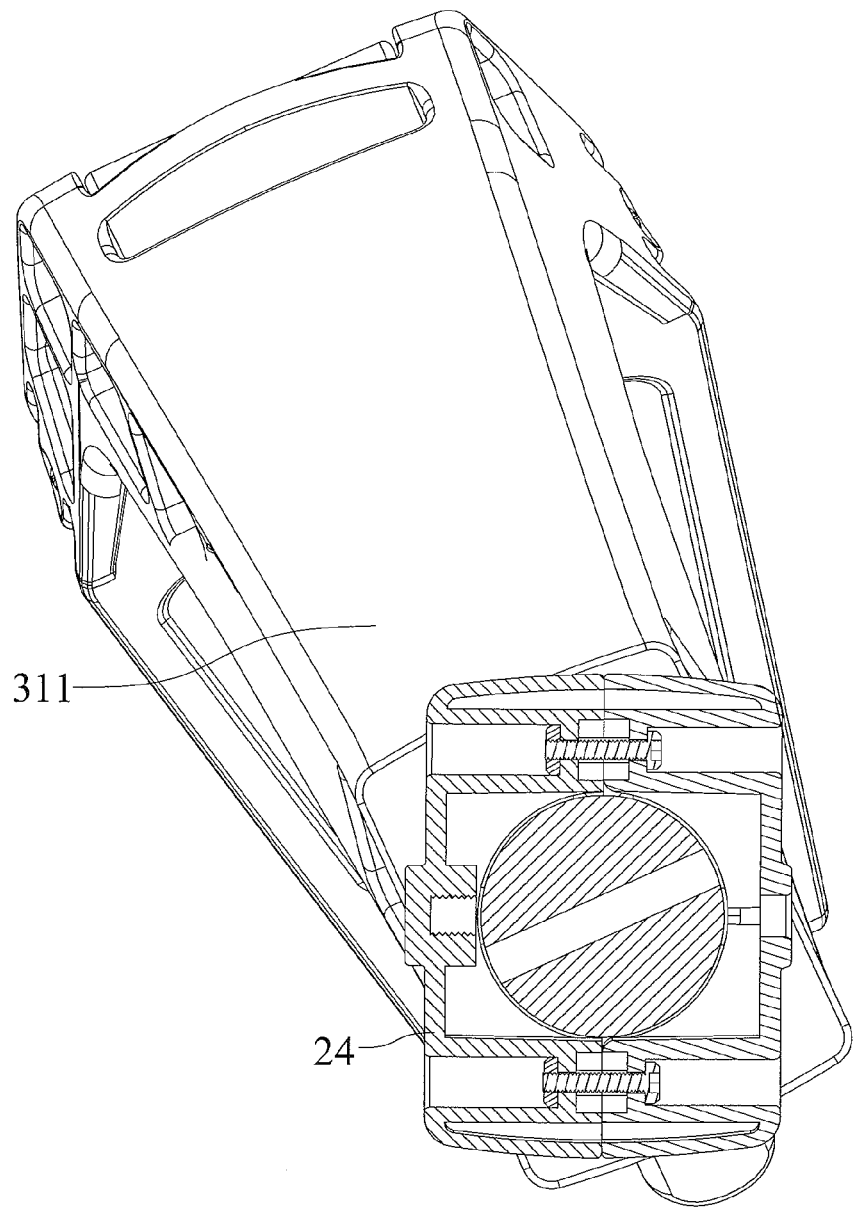
FIG. 11 is an extended cross-sectional view of FIG. 10 showing the multifunctional riding vehicle including frame and steering assembly adapted to be turned relative to one another upon dismounting the fastener, as shown in FIG. 10.
Figure 12:
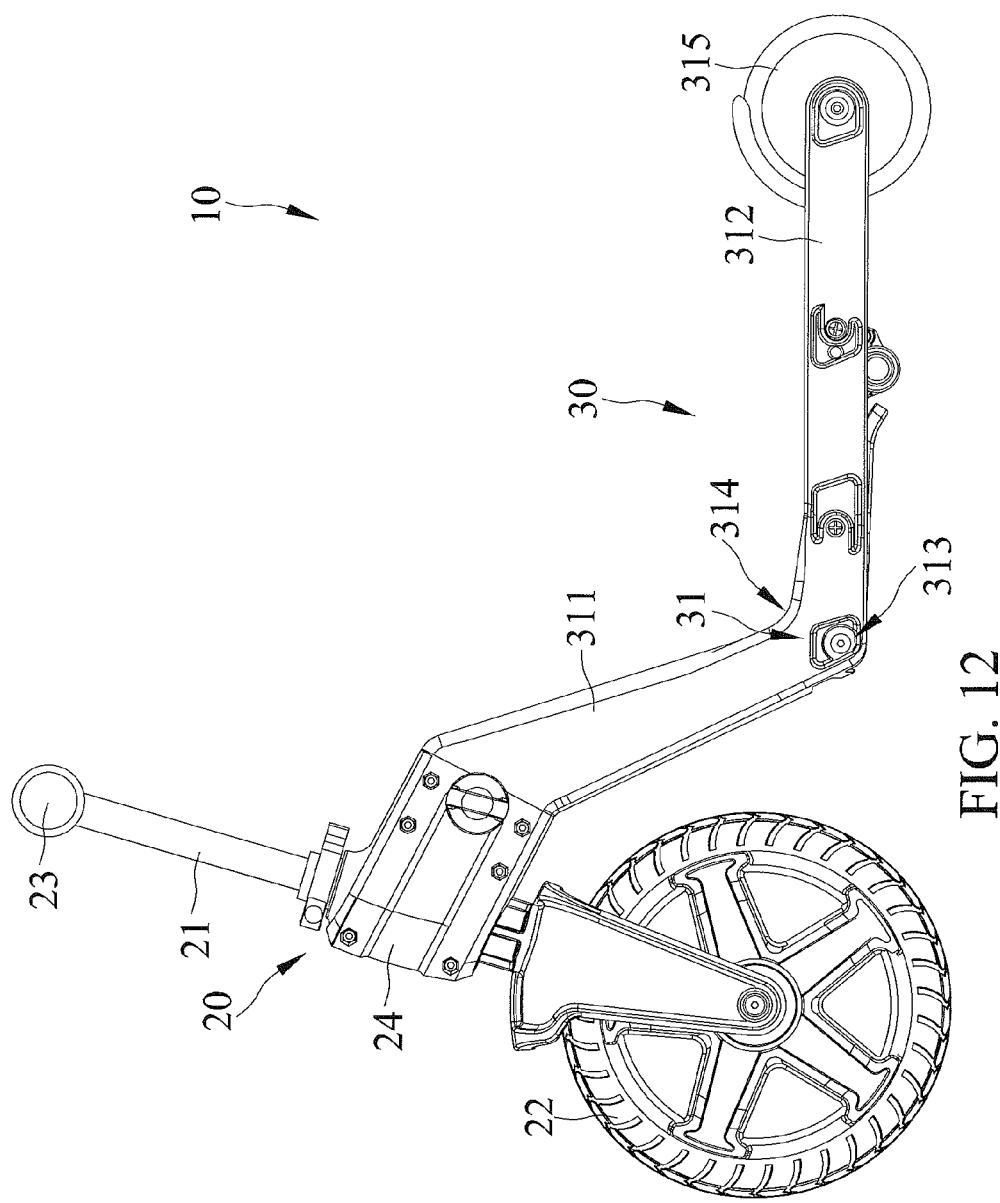
FIG. 12 is a side view showing the multifunctional riding vehicle of the present invention in a different transformation than that shown in FIG. 1.

FIGS. 1 through 12 show a multifunctional riding vehicle 10 of the present invention. The multifunctional riding vehicle 10 includes a steering assembly 20 and a frame 30.

The steering assembly 20 includes a stem 21, a handlebar 23 extending from the stem 21, and a joint 24 pivotally connecting to and being pivotal about the stem 21. The first wheel 22 and the handlebar 23 can be turned synchronously. The handlebar 23 extends symmetrically from the stem 21. The handlebar 23 extends transversely to the stem 21.

A first wheel 22 connects to the steering assembly 20 and a second wheel 315 connecting to the frame 30 respectively. The steering assembly holds the first wheel 22. The frame 30 holds the second wheel 315. The first wheel 22 is adapted to be turned by the handlebar 23.

The frame 30 has a main body 31 including an end thereof pivotally connecting to the joint 24 between different fixed positions, and has a platform 34 adapted to be extended and collapsed. The joint 24 has a circular receiving space. The main body 31 of the frame 30 includes the end thereof which forms a structure with a circular cross section and inserts into the circular receiving space. The platform 34 includes an end thereof pivotally connecting to the main body 31 of the frame 30. The main body 31 of the frame 30 has a hole. The platform 34 has a hole. A pivot inserts into the holes of the main body 31 of the frame 30 and the platform 34.

The multifunctional riding vehicle 10 has a collapsible seating device 32. The platform 34 is adapted to be used as a seat.

A support stand 35 includes a first end thereof pivotally connecting to an end of the platform 34. A pivot extends between the support stand 35 and the platform 34. The support stand 35 includes a second end thereof movably engaging with a groove 318 integrating to the main body 31 of the frame 30. The platform 34 has another hole. The first end of the support stand 35 has a hole. A pivot inserts into the holes of the platform 34 and the support stand 35.

The multifunctional riding vehicle 10 has a first configuration in which the main body 31 of the frame 30 is in a first of the fixed positions and the platform 34 is in an extended position, and a second configuration in which the main body 31 of the frame 30 is in a second of the fixed positions and in an upside-down relationship with respect to the first fixed position and the platform 34 is in a collapsed position. The support stand 35 is in an extended position when the platform 34 is in the extended position thereof. The support stand 35 is in a collapsed position when the platform 34 is in the collapsed position thereof. The support stand 35 extended includes the second end thereof restrained at a first height. The support stand 35 collapsed includes the second end thereof restrained at a second height. The first height is higher than the second height.

The groove 318 extends linearly. The support stand 35 includes the second end thereof moving in a linear path and towards a pivot connection 317 between the platform 34 and the main body 31 of the frame 30 when the platform 34 is being extended. The support stand 35 includes the second end thereof moving in a linear path and away from the pivot connection 317 between the platform 34 and the main body 31 of the frame 30 when the platform 34 is being collapsed.

The main body 31 of the frame 30 includes a recess 316 for receiving the platform 34. The platform 34 in the extended position thereof protrudes outside the recess 316 and an outer periphery of the main body 31 of the frame 30. The platform 34 in the collapsed position thereof is disposed within the recess 316 and the outer periphery of the main body 31 of the frame 30.

The main body 31 of the frame 30 includes a first body section 311 and a second body section 312 extending from the first body section 311 and has a first peripheral edge 313 and a second peripheral edge 314. The main body 31 of the frame 30 is in a substantially L shape. The multifunctional riding vehicle 10 in the first configuration thereof includes the first body section 311 of the main body 31 of the frame 30 extending at a left-right direction and the second body section 312 of the main body 31 of the frame 30 extending at an up-down direction. The multifunctional riding vehicle 10 in the second configuration thereof includes the first body section 311 of the main body 31 of the frame 30 extending at the up-down direction and the second body section 312 of the main body 31 of the frame 30 extending at the left-right direction.

The main body 31 of the frame 30 pivotally connects to the joint 24 with a first end of the first body section 311. The first body section 311 has a second end distal to the first end at a longitudinal direction thereof. The second body section 312 extends from the second end of the first body section 311.

A lock 36 engages with the platform 34 for sustaining the platform 34 at a fixed position. The lock 36 has a lock position and an unlock position. The lock 36 is adapted to be in the lock position thereof when the platform 34 in the extended position thereof, thereby allowing the platform to be releasably sustained at a fixed position. In the embodiment, the lock 36 engages with the support stand 35 for sustaining the second end of the support stand at a fixed position and the platform 34 at a fixed position. The lock 36 includes at least one housing 361 integrating with the main body of the frame 30, at least one control 362 accommodated by the at least one housing 361, at least one biasing member 363 retained between the support stand 35 and the at least one control 362, and at least one protrusion 364 protruding from the at least one control 362 and engaging in the groove 318. Therefore, the at least one biasing member 363 applies resilient force to bias the at least one control 362. In the embodiment, the at least one housing 361 includes two housings 361 disposed symmetrically on two sides of the support stand 35, the at least one control 362 includes two controls 362 disposed symmetrically on two sides of the support stand 35, the at least one biasing member 363 includes two biasing members 363 disposed symmetrically on two sides of the support stand 35, and the at least one protrusion 364 includes two protrusions 364 disposed symmetrically on two sides of the support stand 35.

A positioning structure 319 connects to the groove 318. The lock 36 is in the lock position thereof and includes the at least one protrusion 364 engaging with the positioning structure 319 when the platform 34 in the extended position thereof is sustained. The lock 36 is in the unlock position thereof and includes the at least one protrusion 364 disengaging from the position structure 319 and engaging in the groove 318 when the platform 34 moves. The positioning structure 319 is in a form of a hole.

A retainer 33 for sustaining the steering assembly 20 and the main body 31 of the frame 30 at a fixed relative position. The retainer 33 engages with the steering assembly 20 and the main body 31 of the frame 30 when the steering assembly 20 and the main body 31 of the frame 30 are disposed at a fixed relative position. The retainer 33 disarticulates the steering assembly 20 and the main body 31 of the frame 30 to allow the steering assembly 20 to move relative to the main body 31 of the frame 30. The joint 24 and the retainer 33 each have threads. The main body 31 of the frame 30 has a hole extending therethrough. The retainer 33 inserts through the main body 31 of the frame 30 through the hole and includes the threads thereof engaging with the threads of the joint 24 when the steering assembly 20 and the main body 31 of the frame 30 are disposed at a fixed relative position.

In view of the forgoing, the multifunctional riding vehicle 10 in the first configuration thereof includes the main body 31 of the frame 30 in the first of the fixed positions thereof and the platform 34 in the extended position thereof. Moreover, the multifunctional riding vehicle 10 in the second configuration thereof includes the main body 31 of the frame 30 in the second of the fixed positions thereof and the platform 34 is in the collapsed position thereof. The main body 31 of the frame 30 includes the second fixed position thereof in an upside-down relationship with respect to the first fixed position thereof.

The foregoing is merely illustrative of the principles of this invention, and various modifications can be made by those skilled in the art without departing from the scope and spirit of the invention.

What is claimed is:

1. A multifunctional riding vehicle comprising:
    a steering assembly having a joint; and
    a frame having a main body including an end thereof pivotally connecting to the joint between different fixed positions, and having a platform adapted to be extended and collapsed;
    wherein the multifunctional riding vehicle has a first configuration in which the main body of the frame is in a first of the fixed positions and the platform is in an extended position, and a second configuration in which the main body of the frame is in a second of the fixed positions and in an upside-down relationship with respect to the first fixed position and the platform is in a collapsed position, and
    wherein the main body of the frame includes a recess for receiving the platform, wherein the platform in the extended position thereof protrudes outside the recess and an outer periphery of the main body of the frame, and wherein the platform in the collapsed position thereof is disposed within the recess and the outer periphery of the main body of the frame.

2. The multifunctional riding vehicle as claimed in claim 1, wherein the platform includes an end thereof pivotally connecting to the main body of the frame, with a pivot extending between the platform and the main body of the frame.

3. The multifunctional riding vehicle as claimed in claim 2 further comprising a support stand including a first end thereof pivotally connecting to an end of the platform, with a pivot extending between the support stand and the platform, and including a second end thereof movably engaging with a groove integrating to the main body of the frame.

4. The multifunctional riding vehicle as claimed in claim 3 further comprising a lock engaging with the support stand for sustaining the second end of the support stand at a fixed position and the platform at a fixed position, wherein the lock has a lock position and an unlock position, and wherein the lock is adapted to be in the lock position thereof when the platform in the extended position thereof, thereby allowing the platform to be releasably sustained at a fixed position.

5. The multifunctional riding vehicle as claimed in claim 4, wherein the lock includes at least one housing integrating with the main body of the frame, at least one control accommodated by the at least one housing, at least one biasing member retained between the support stand and the at least one control, and at least one protrusion protruding from the at least one control and engaging in the groove.

6. The multifunctional riding vehicle as claimed in claim 5 further comprising a positioning structure connecting to the groove, wherein the lock is in the lock position thereof and includes the at least one protrusion engaging with the positioning structure when the platform in the extended position thereof is sustained, and wherein the lock is in the unlock position thereof and includes the at least one protrusion disengaging from the positioning structure and engaging in the groove when the platform moves.

7. The multifunctional riding vehicle as claimed in claim 6, wherein the positioning structure is in a form of a hole.

8. The multifunctional riding vehicle as claimed in claim 3, wherein the groove extends linearly, wherein the support stand includes the second end thereof moving in a linear path and towards a pivot connection between the platform and the main body of the frame when the platform is being extended, and wherein the support stand includes the second end thereof moving in a linear path and away from the pivot connection between the platform and the main body of the frame when the platform is being collapsed.

9. The multifunctional riding vehicle as claimed in claim 1 further comprising a lock engaging with the platform for sustaining the platform at a fixed position, wherein the lock has a lock position and an unlock position, and wherein the lock is adapted to be in the lock position thereof when the platform in the extended position thereof, thereby allowing the platform to be releasably sustained at a fixed position.

10. The multifunctional riding vehicle as claimed in claim 1, wherein the main body of the frame includes a first body section and a second body section extending from the first body section, wherein the main body of the frame is in a substantially L shape, wherein the multifunctional riding vehicle in the first configuration thereof includes the first body section of the main body of the frame extending at a left-right direction and the second body section of the main body of the frame extending at an up-down direction, and wherein the multifunctional riding vehicle in the second configuration thereof includes the first body section of the main body of the frame extending at the up-down direction and the second body section of the main body of the frame extending at the left-right direction.

11. The multifunctional riding vehicle as claimed in claim 1 further comprising a retainer for sustaining the steering assembly and the main body of the frame at a fixed relative position, wherein the retainer engages with the steering assembly and the main body of the frame when the steering assembly and the main body of the frame are disposed at a fixed relative position, and wherein the retainer disarticulating the steering assembly and the main body of the frame to allow the steering assembly to move relative to the main body of the frame.

12. The multifunctional riding vehicle as claimed in claim 11, wherein the joint and the retainer each have threads, wherein the main body of the frame has a hole extending therethrough, and wherein the retainer inserts through the main body of the frame through the hole and includes the threads thereof engaging with the threads of the joint when the steering assembly and the main body of the frame are disposed at a fixed relative position.

13. The multifunctional riding vehicle as claimed in claim 1, wherein the steering assembly includes a stem and a handlebar extending from the stem, and wherein the joint pivotally connects to and is pivotal about the stem.

14. The multifunctional riding vehicle as claimed in claim 1 further comprising a first wheel connecting to the steering assembly and a second wheel connecting to the frame respectively, with the steering assembly holding the first wheel, and with the frame holding the second wheel.

15. A multifunctional riding vehicle comprising:
    a steering assembly having a joint;
    a frame having a main body including an end thereof pivotally connecting to the joint between different fixed positions, and having a platform adapted to be extended and collapsed, wherein the platform includes an end thereof pivotally connecting to the main body of the frame, with a pivot extending between the platform and the main body of the frame;
    a support stand including a first end thereof pivotally connecting to an end of the platform, with a pivot extending between the support stand and the platform, and including a second end thereof movably engaging with a groove integrating to the main body of the frame;

a lock engaging with the support stand for sustaining the second end of the support stand at a fixed position and the platform at a fixed position, wherein the lock has a lock position and an unlock position, and wherein the lock is adapted to be in the lock position thereof when the platform in the extended position thereof, thereby allowing the platform to be releasably sustained at a fixed position, wherein the lock includes at least one housing integrating with the main body of the frame, at least one control accommodated by the at least one housing, at least one biasing member retained between the support stand and the at least one control, and at least one protrusion protruding from the at least one control and engaging in the groove;

wherein the multifunctional riding vehicle has a first configuration in which the main body of the frame is in a first of the fixed positions and the platform is in an extended position, and a second configuration in which the main body of the frame is in a second of the fixed positions and in an upside-down relationship with respect to the first fixed position and the platform is in a collapsed position, and wherein the at least one housing includes two housings disposed symmetrically on two sides of the support stand, wherein the at least one control includes two controls disposed symmetrically on two sides of the support stand, wherein the at least one biasing member includes two biasing members disposed symmetrically on two sides of the support stand, and wherein the at least one protrusion includes two protrusions disposed symmetrically on two sides of the support stand.

16. The multifunctional riding vehicle as claimed in claim 15 further comprising two positioning structures connecting to the groove, wherein the lock is in the lock position thereof and includes the two protrusions engaging with the two positioning structures respectively when the platform in the extended position thereof is sustained, and wherein the lock is in the unlock position thereof and includes the two protrusions disengaging from the two positioning structures and engaging in the groove when the platform moves.

17. The multifunctional riding vehicle as claimed in claim 16, wherein each of the two positioning structures is in a form of a hole.

* * * * *